United States Patent
Berg et al.

(10) Patent No.: US 10,484,521 B2
(45) Date of Patent: Nov. 19, 2019

(54) MODULAR DEVICE AND METHODS THEREFOR

(71) Applicant: GOOGLE TECHNOLOGY HOLDINGS LLC, Mountain View, CA (US)

(72) Inventors: Daniel T. Berg, Gilroy, CA (US); Christopher A. Arnholt, Highland Park, IL (US); Carl A. Cepress, Chicago, IL (US); Max K. Yoshimoto, Sunnyvale, CA (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 16/146,575

(22) Filed: Sep. 28, 2018

(65) Prior Publication Data
US 2019/0037061 A1   Jan. 31, 2019

Related U.S. Application Data

(63) Continuation of application No. 14/448,863, filed on Jul. 31, 2014, now abandoned.
(Continued)

(51) Int. Cl.
*H04M 1/02* (2006.01)
*H04B 1/3827* (2015.01)
(Continued)

(52) U.S. Cl.
CPC ........ *H04M 1/0254* (2013.01); *G06F 1/1626* (2013.01); *G06F 1/1635* (2013.01);
(Continued)

(58) Field of Classification Search
CPC ........... H04M 1/0254; H04M 1/72575; H04M 1/0264; H04B 1/088; H04B 1/3833;
(Continued)

(56) References Cited

U.S. PATENT DOCUMENTS 5,918,189 A * 6/1999 Kivela ................... H01Q 1/243
343/700 MS
7,593,723 B2   9/2009 Zarom
(Continued)

OTHER PUBLICATIONS

Dave Hakkens, Phonebloks, http://phonebloks.com/, downloaded from Internet on Oct. 4, 2013.

*Primary Examiner* — Anthony S Addy
*Assistant Examiner* — Farid Seyedvosoghi
(74) *Attorney, Agent, or Firm* — Dority & Manning, P.A.

(57) ABSTRACT

A device (1400) includes an electronic device (100) with one or more processors (501), one or more memory devices (508), a display (101), and a first electrical connector (206). An electronic accessory module (600) includes a second electrical connector (806). A housing (1100) receives the electronic accessory module at a first end of the housing and receives the electronic device at a second end of the housing. The housing biases the first electrical connector and the second electrical connector together and couples to both the electronic device and the electronic accessory module to secure the electronic device and the electronic accessory module within the housing.

17 Claims, 16 Drawing Sheets

Related U.S. Application Data

(60) Provisional application No. 61/968,726, filed on Mar. 21, 2014.

(51) Int. Cl.
  *H04B 1/08* (2006.01)
  *H04M 1/725* (2006.01)
  *G06F 1/16* (2006.01)

(52) U.S. Cl.
  CPC .......... *G06F 1/1686* (2013.01); *G06F 1/1698* (2013.01); *H04B 1/088* (2013.01); *H04B 1/3833* (2013.01); *H04M 1/72575* (2013.01); *H04M 1/0264* (2013.01)

(58) Field of Classification Search
  CPC .... G06F 1/1626; G06F 1/1635; G06F 1/1686; G06F 1/1698
  USPC ..... 455/556.1, 550.1, 575.1, 575.8; 361/600, 361/625, 679.03, 679.3, 679.41, 679.43, 361/730, 731; 379/428.01, 433.01, 379/433.11, 433.12, 451, 455
  See application file for complete search history.

(56) References Cited

U.S. PATENT DOCUMENTS

| | | |
|---|---|---|
| 8,326,353 B1 | 12/2012 | Nasserbakht et al. |
| 8,887,902 B1 | 11/2014 | Liu |
| 2003/0036407 A1 | 2/2003 | Kapoor et al. |
| 2004/0242264 A1* | 12/2004 | Cho .................... H04M 1/0258 455/550.1 |
| 2005/0013434 A1 | 1/2005 | Qin et al. |
| 2006/0091222 A1 | 5/2006 | Leung et al. |
| 2007/0037551 A1 | 2/2007 | Piekarz |
| 2007/0099592 A1 | 5/2007 | Thome et al. |
| 2007/0201227 A1 | 8/2007 | Camp et al. |
| 2009/0081963 A1 | 3/2009 | Boren |
| 2009/0174666 A1* | 7/2009 | Matsuoka ............ G06F 1/1624 345/169 |
| 2009/0271109 A1 | 10/2009 | Lee et al. |
| 2009/0323270 A1 | 12/2009 | Li |
| 2010/0167783 A1 | 7/2010 | Alameh et al. |
| 2010/0235425 A1 | 9/2010 | Holden et al. |
| 2011/0021255 A1 | 1/2011 | Kim et al. |
| 2011/0054268 A1 | 3/2011 | Fidacaro et al. |
| 2012/0052916 A1 | 3/2012 | Wong et al. |
| 2012/0177967 A1* | 7/2012 | Wang .................... G06F 1/1632 429/100 |
| 2015/0001291 A1 | 1/2015 | Govindarajan et al. |
| 2016/0269079 A1 | 9/2016 | Nambord et al. |

* cited by examiner

MODULAR DEVICE AND METHODS THEREFOR

CROSS-REFERENCE TO RELATED APPLICATIONS

This application is a continuation of U.S. patent application Ser. No. 14/448,863, filed Jul. 31, 2014, which claims priority benefit of U.S. Provisional Application No. 61/986,726, filed Mar. 21, 2014.

Each of the above-identified patent applications is incorporated herein by reference.

TECHNICAL FIELD

This disclosure relates generally to devices, and more particularly to electronic devices.

BACKGROUND

Portable electronic devices, such as smart phones, tablet computers, and the like, are becoming increasingly powerful computational tools. These devices are also becoming more prevalent in today's society. Not too long ago a mobile telephone was a simplistic device capable of only making voice calls. Today, "smart" phones, tablet computers, personal digital assistants, and other portable electronic devices not only handle voice communication, but also manage address books, maintain calendars, play music and videos, display pictures, and surf the web.

As the capabilities of these electronic devices have progressed, so too has consumer demand for customization. Many users today view their smart devices not only as utilitarian tools, but also as fashion statements as well. Other users demand niche features in smart devices so the devices can be used with hobbies or jobs. This demand for customization is in conflict with the regulatory requirements such devices must meet before shipment. While a manufacturer may like to have thousands of different SKUs for electronic devices, this requires sending thousands of devices through regulatory testing. Wireless communication, product safety, product reliability, and other regulatory testing are expensive and time consuming. It would be advantageous to be able to provide customization options while mitigating device qualification demands.

Figure 1:
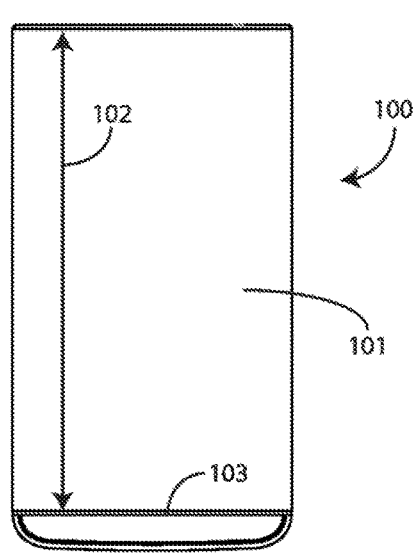
FIG. 1 illustrates a front elevation view of one explanatory electronic device configured in accordance with one or more embodiments of the disclosure.
Figure 2:
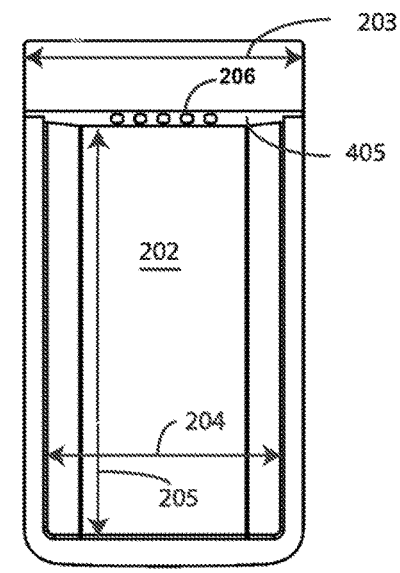
FIG. 2 illustrates a rear elevation view of one explanatory electronic device configured in accordance with one or more embodiments of the disclosure.
Figure 3:
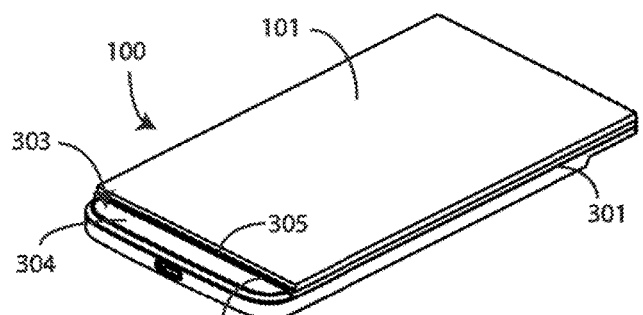
FIG. 3 illustrates a perspective view of one explanatory electronic device configured in accordance with one or more embodiments of the disclosure.
Figure 4:
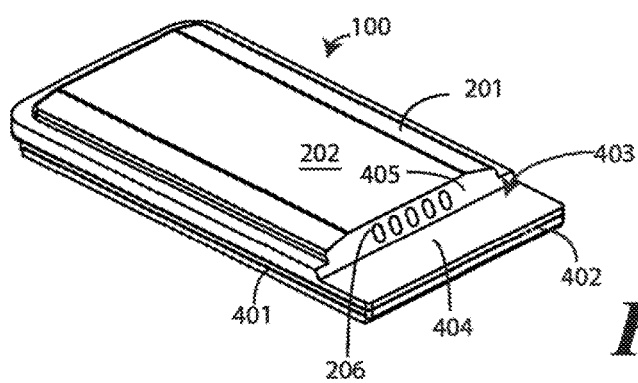
FIG. 4 illustrates another perspective view of one explanatory electronic device configured in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION

Before describing in detail embodiments that are in accordance with the present disclosure, it should be observed that the embodiments reside primarily in combinations of method steps and apparatus components related to a modular electronic device that includes an electronic device and one or more interchangeable electronic accessory modules.

Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

It will be appreciated that embodiments of the disclosure described herein may be comprised of one or more conventional processors and unique stored program instructions that control the one or more processors to implement, in conjunction with certain non-processor circuits, some, most, or all of the functions of operation of the electronic device, the electronic accessory module, or the two in combination. The non-processor circuits may include, but are not limited to, a radio receiver, a radio transmitter, signal drivers, clock circuits, power source circuits, and user input devices. As such, these functions may be interpreted as steps of a method to perform the operational functionality found in each device. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure. A would refer to an element, 10, shown in figure other than figure A.

Embodiments of the disclosure provide a customizable, modular device that includes an electronic device and an electronic accessory module. The electronic device and electronic accessory module can be locked into a housing so that a first electrical connector of the electronic device is biased against a second electrical connector of the electronic accessory module so that the two components can communicate to offer enhanced device functionality. The housing is to couple both the electronic device and the electronic accessory module to secure the two components within the housing. A user can then customize and modify the device by attaching different electronic accessory modules to the electronic device to create new and changing devices with unique features. Additionally, different housings can be used with the electronic device to create customized device experiences.

In one or more embodiments, an electronic device can be configured as a modular component that can be inserted into a customized housing. For example, in one embodiment the electronic device is configured as a transceiver module and includes device components such as a display, wireless communication circuitry and antenna(s), one or more processors for providing device functionality, power management components, and so forth. The electronic device, in one embodiment, s a standard component that is customized by adding different electronic accessory modules. Said differently, each device "kit" includes the electronic device as a standard, single unit. The inclusion of components such as wireless communication circuitry into a base device that is used in many different combinations simplifies regulatory approval as it provides a singular configuration for Federal Communications Commission and other regulatory approvals.

The electronic device is operable with one or more electronic accessory modules. In one embodiment, the electronic accessory module has an electrical connector to interface with the electronic device. Each electronic accessory module can be customized with components to offer different features and functionality to devices that use the common electronic device with a customized electronic accessory module. Examples of electronic accessory modules include audio devices, gaming devices, fitness devices, scanning devices, imaging devices, user input devices, haptic devices, memory devices, or display devices. This list is explanatory only, as other types of electronic accessory modules will be obvious to those of ordinary skill in the art having the benefit of this disclosure.

The electronic device and a corresponding electronic accessory module are coupled together, in one embodiment, by a housing. The housing, like the electronic accessory module, can be customized as desired by the user. Housings can be manufactured with different mechanical features, different cosmetic styles and form factors, different, feature sets, in different colors, and from different materials. The ability of a user to choose one or more electronic accessory modules and one or more housings, each operable with a common electronic device, allows the user to purchase a single electronic device and customize it in a myriad of different ways.

In one embodiment, the housing provides several different functions for a resulting device. The housing is to receive the electronic accessory module at a first end of the housing and receive the electronic device at a second end of the housing. When both the electronic device and the electronic accessory module are disposed within the housing, in one or more embodiments the housing is to bias a first electrical connector of the electronic device and a second electrical connector of the electronic accessory module together so that the two devices can communicate and provide device functionality. Additionally, in one or more embodiments, the housing is to further couple to both the electronic device and the electronic accessory module to secure the electronic device and the electronic accessory module within the housing.

Turning now to FIGS. 1-4, illustrated therein is one embodiment of an electronic device 100 configured in accordance with one or more embodiments of the disclosure. In one embodiment, the electronic device 100 is constructed as a sealed unit, with a display 101 disposed along a front side of the electronic device 100 and component casing 201 disposed on a rear side of the electronic device 100. For example, the electrical components of the electronic device 100 can be potted, sealed, or otherwise disposed within the component casing 201 so that the electronic device 100 effectively becomes a unitary solid-state unit The component casing 201 can be manufactured from an injection-molded thermoplastic material disposed about a periphery of the display 101 so that the electronic device is a single, rugged, sealed unit.

Figure 5:
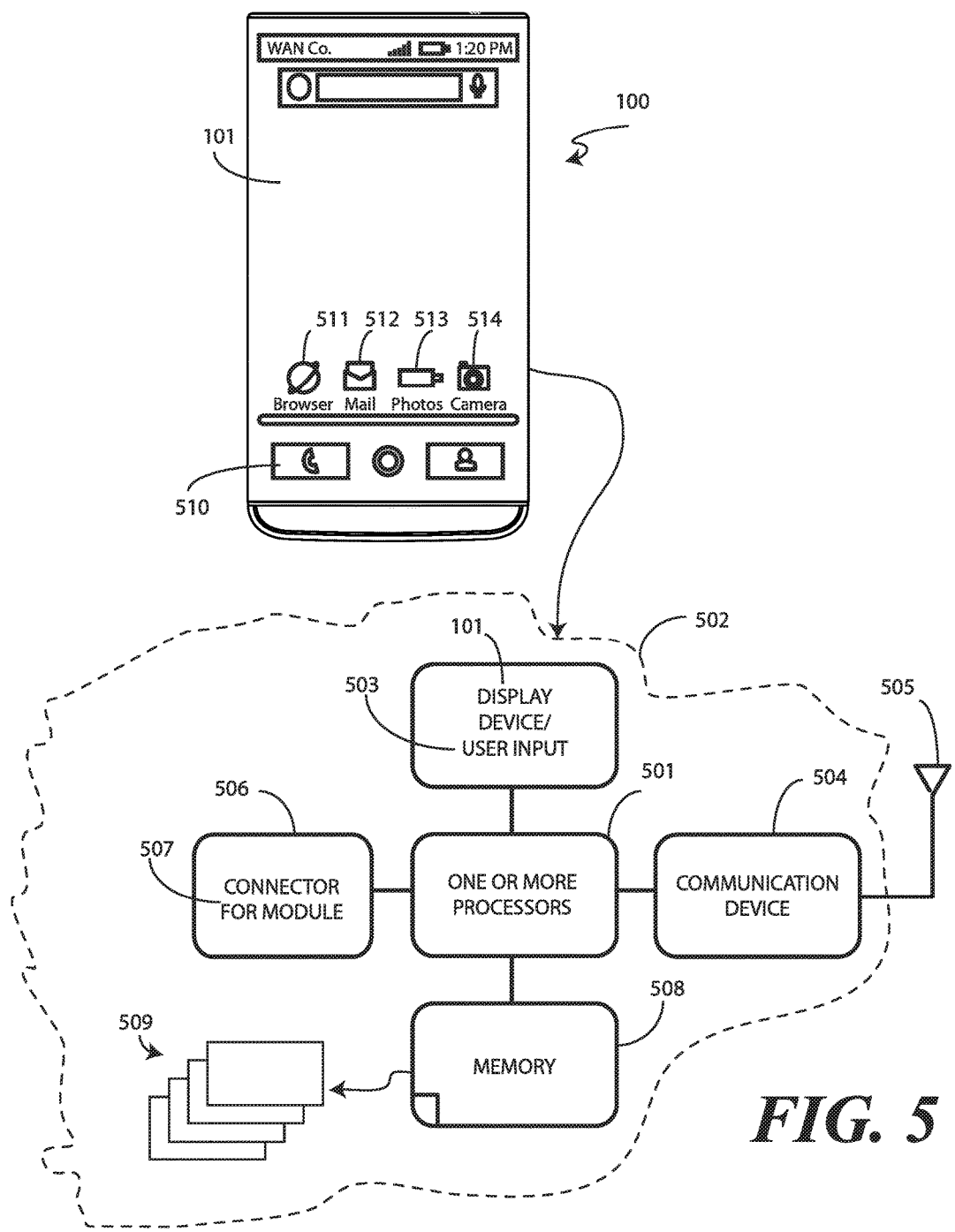
FIG. 5 illustrates a schematic block diagram of one explanatory electronic device configured in accordance with one or more embodiments of the disclosure.
Figure 6:
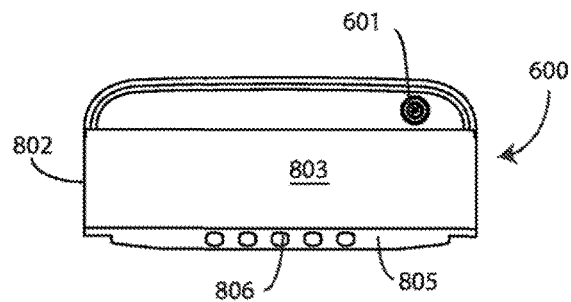
FIG. 6 illustrates a front elevation view of one explanatory electronic accessory module configured in accordance with one or more embodiments of the disclosure.
Figure 7:
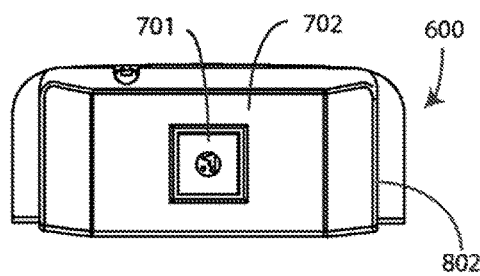
FIG. 7 illustrates a rear elevation view of one explanatory electronic accessory module configured in accordance with one or more embodiments of the disclosure.
Figure 8:
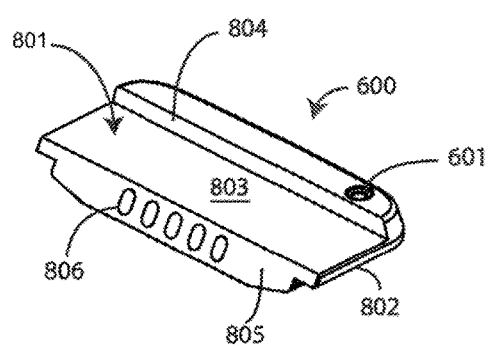
FIG. 8 illustrates a perspective view of one explanatory electronic accessory module configured in accordance with one or more embodiments of the disclosure.
Figure 9:
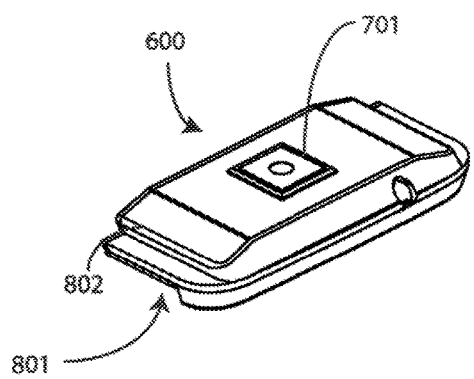
FIG. 9 illustrates another perspective view of one explanatory electronic accessory module configured in accordance with one or more embodiments of the disclosure.

Turning briefly to FIG. 5, illustrated therein are some of the components that can be included in the electronic device 100. Note that the explanatory electronic device 100 is shown as a smart phone for ease of illustration. However, it will be obvious to those of ordinary skill in the art having the benefit of this disclosure that other portable electronic devices may be substituted for the explanatory smart phone. The electronic device 100 may be configured as a palm-top computer, a tablet computer, a gaming device, wearable computer, a remote controller, a media player, laptop computer, portable computer, or other electronic device.

In one embodiment, the display 101 is disposed along the front surface of the electronic device 100. In one embodiment, the display 101 is configured to provide visual output, images, or other visible indicia to a user. In one embodiment, the display 101 comprises an organic light emitting diode (OILED) device. In one embodiment, the display 101 comprises a touch sensor to form touch sensitive display configured to receive user input across the surface of the display 101. The display 101 can also be configured with a force sensor. Where configured with both a touch sensor and force sensor, one or more processors 501 of the electronic device 100, operable with the touch sensor and the force sensor, can determine not only where the user contacts the display 101, but also how much force the user employs in contacting the display 101.

In FIG. 5, the electronic device 100 is shown illustratively with a schematic block diagram 502. In this embodiment, the electronic device 100 includes a user interface 503, which can include the display 101. The illustrative electronic device 100 also includes a communication circuit 504 that can be configured for wired or wireless communication with one or more other devices or networks. The networks can include a wide area network, a local area network, or personal area network as well. Examples of wide area networks include GSM, CDMA, WCDMA, CDMA-2000, iDEN. TDMA, 2.5 Generation 3GPP GSM networks, 3rd Generation 3GPP WCDMA networks, 3GPP Long Term Evolution (LTE) networks, and 3GPP2 CDMA communication networks. UMTS networks, E-UTRA networks, and other networks. The communication circuit 504 can include wireless communication circuitry, one of a receiver, a transmitter, or transceiver, and one or more antennas 505.

The electronic device 100 includes one or more processors 501, which can have one or more control circuits. The one or more processors 501 are responsible for performing the various functions of the electronic device 100. The one or more processors 501 can be a microprocessor, a group of processing components, one or more Application Specific Integrated Circuits (ASICs), programmable logic, or other type of processing device. The one or more processors 501 can be operable with the user interface 503 and the communication circuit 504 as well as various peripheral devices, ports, or connectors 506 that can be coupled to the electronic device 100 via interface connections. As will be described in more detail below, in one embodiment the electronic device 100 includes at least one electrical connector 507 to couple with an electronic accessory module when the electronic device 100 and the electronic accessory module are disposed within a housing.

The one or more processors 501 can be configured to process and execute executable software code to perform the various functions of the electronic device 100. A storage device, such as memory 508, stores the executable software code used by the one or more processors 501 for device operation. The executable software code used by the one or more processors 501 can be configured as one or more modules 509 that are operable with the one or more processors 501. Such modules 509 can store instructions, control algorithms, and so forth. The instructions can instruct processors or one or more processors 501 to perform the various functions of the electronic device 100, including interacting with and/or controlling an electronic accessory module as described below.

In one embodiment, the one or more processors 501 are responsible for running the operating system environment of the electronic device 100. The operating system environment can include a kernel, one or more drivers, and an application service layer, and an application layer. The operating system environment can be configured as executable code operating on one or more processors 501 or control circuits of the electronic device 100.

The application layer can be responsible for executing application service modules. The application service modules may support one or more applications or "apps." Examples of such applications shown in FIG. 5 include a cellular telephone application 510 for making voice telephone calls, a web browsing application 511 configured to allow the user to view webpages on the display 101 of the electronic device 100, an electronic mail application 512 configured to send and receive electronic mail, a photo application 513 configured to permit the user to view images or video on the display 101 of electronic device 100, and a camera application 514 configured to capture still (and optionally video) images. These applications are illustrative only, as others will be obvious to one of ordinary skill in the art having the benefit of this disclosure. In one or more embodiments, the one or more processors 501 are responsible for managing the applications and all data communications of the electronic device 100. The applications of the application layer can be configured as clients of the application service layer to communicate with services through application program interfaces (APIs) messages, events, or other inter-process communication interfaces.

Turning now back to FIGS. 1-4, many of the mechanical features of one illustrative electronic device 100 are shown. While electronic devices configured in accordance with embodiments of the disclosure can be configured with a wide variety of mechanical features and form factors, those shown in FIGS. 1-4 are advantageous in some embodiments in that they facilitate reliable coupling to both the housing and to the electronic accessory modules that will be described below with reference to FIGS. 6-9.

In one embodiment, the display 101 is wider than the main portion 202 of the component casing 201. In one or more embodiments, the main portion 202 houses various components such as the one or more processors (501) of the electronic device 100, the memory devices (508), communication circuits (504), antennas (505) and so forth. In the illustrative embodiment of FIG. 104, the width 203 of the display 101 is greater than the width 204 of the main portion 202 of the component casing 201. Additionally, in one embodiment the length 102 of the display 101 is greater than the length 205 of the main portion 202 of the component casing 201.

In one embodiment, the component casing 201 surrounds the display 101 and further defines one or more coupling mechanisms 301,302,401,402 disposed about the periphery of the electronic device 100. In one embodiment, the one or more coupling mechanisms 301,302,401,402 comprise protrusions extending from the sides of the electronic device 100 that are to couple with corresponding recesses in a housing. In other embodiments, the one or more coupling mechanisms 301,302,401,402 comprise recesses into the sides of the electronic device 100. Corresponding protrusions in a housing can then couple to the one or more coupling mechanisms 301,302,401,402. Other coupling mechanisms, including ramps, snaps, detents, and so forth will be obvious to those of ordinary skill in the art having the benefit of this disclosure.

In one embodiment, the electronic device 100 is configured with a first rabbet 303 and a second rabbet 403. The first rabbet 303 can be formed by the component casing 201 extending beyond a bottom 103 of the display 101. A second rabbet 403 can be formed by a step-shaped recess being defined into the rear side of the electronic device 100 along the component casing 201. As will be described below, the first rabbet 303 can be toed into a housing to help retain the electronic device 100 within the housing. The second rabbet can form a match to an edge or tongue of a rabbet found on an electronic accessory module so that an electrical connector 206 of the electronic device 100 can be biased against a corresponding electrical connector of an electronic accessory module. In this illustrative embodiment, rabbet 303 is defined by step 304 and display side edge 305. Rabbet 403 is defined by step 404 and side edge 405. Side edge 405 extends from step 404 at an obtuse angle, which is about 105 degrees in this embodiment.

Disposed along side edge 405 is electrical connector 406. As will be described in more detail below, the one or more processors (501) of the electronic device 100 are to send one or more of audio data, display data, or haptic data through the electrical connector 406 to an electronic accessory module in one or more embodiments. In other embodiments, the one or more processors (501) of the electronic device 100 are to receive one or more of image data, audio data, sensor data, or power through the electrical connector 406 from the electronic accessory module. Of course, the one or more processors (501) can also send and receive data through the first electrical connector 406 as well. In this illustrative embodiment, the electrical connector 406 is a four terminal connector defined by four conductive contacts being disposed along the side edge 405 of the component casing 201 of the electronic device 100.

Turning now to FIGS. 6-9, illustrated therein is one embodiment of an electronic accessory module 600 configured in accordance with one or more embodiments of the disclosure. In one embodiment, the electronic accessory module 600 is constructed as a sealed unit, with a one or more module components 601,701 disposed along a front side of the electronic accessory module 600, the rear side of the electronic accessory module 600, or combinations thereof. As with the electronic device (100), in one embodiment the electronic accessory module 600 includes a component casing 702 disposed on a rear side of the electronic accessory module 600. The component casing 702 can be manufactured from an injection-molded thermoplastic material so that the electronic accessory module 600 is configured as a single, rugged, sealed unit.

Figure 10:
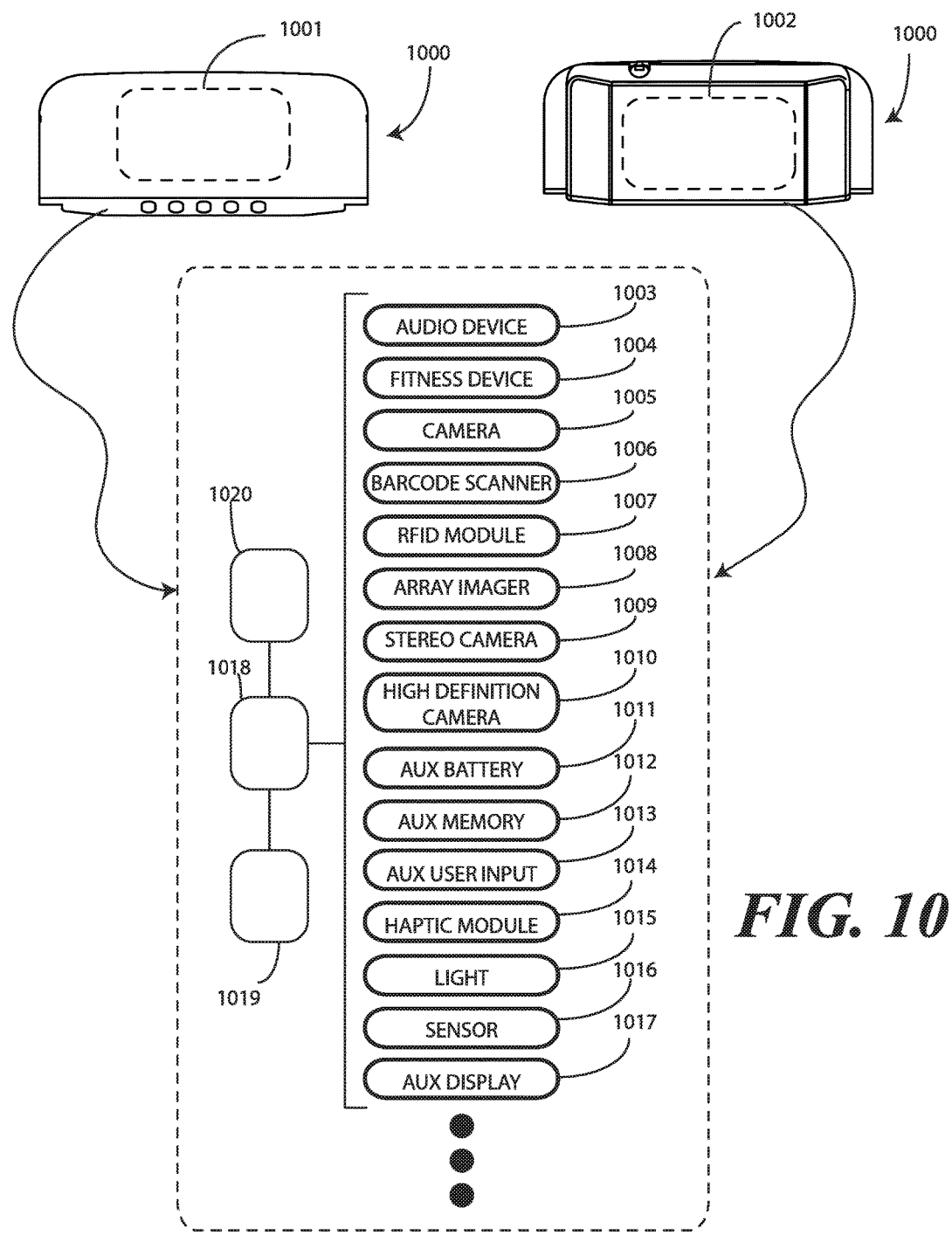
FIG. 10 illustrates explanatory components of electronic accessory modules configured in accordance with one or more embodiments of the disclosure.

In accordance with one or more embodiments of the disclosure, the electronic accessory module 600 can be configured with different module components 601,701 so that when the electronic accessory module 600 is coupled with an electronic device (100) in a housing, the module components 601,701 provide new, additional, enhanced, or auxiliary functions for the overall resulting device. In the illustrative embodiment of FIGS. 6-9, the module components 601,701 are imaging devices, and in particular camera devices, so that the electronic accessory module 600 works as an imaging device. However, any number of different module components 601,701 can be used with electronic accessory modules configured in accordance with embodiments of the disclosure. Turning briefly to FIG. 10, illustrated therein are a few examples.

In one embodiment, the module components 1001,1002 of the electronic accessory module 1000 can be one or more microphones, loudspeakers, or combinations thereof so that the electronic accessory module 1000 is an audio device 1003. In another embodiment, the module components 1001,1002 of the electronic accessory module 1000 can include accelerometers, biometric sensors, or other devices so that the electronic accessory module 1000 functions as a fitness device 1004. In yet another embodiment, the module components 1001,1002 of the electronic accessory module 1000 can include photo detectors or other devices so that the electronic accessory module 1000 functions as a camera 1005.

In another embodiment, the module components 1001, 1002 of the electronic accessory module 1000 can include scanning devices so that the electronic accessory module 1000 functions as a barcode scanner 1006. In another embodiment, the module components 1001,1002 of the electronic accessory module 1000 can include devices so that the electronic accessory module 1000 functions as a. In another embodiment, the module components 1001,1002 of the electronic accessory module 1000 can include radio frequency identification (RFID) communication circuits and devices so that the electronic accessory module 1000 functions as a RFID module. In another embodiment the module components 1001,1002 of the electronic accessory module 1000 can include image capture and data recognition devices so that the electronic accessory module 1000 functions as a array imager 1008.

In another embodiment, the module components 1001, 1002 of the electronic accessory module 1000 can include multiple image capture devices so that the electronic accessory module 1000 functions as a stereo camera 1009. In another embodiment, the module components 1001,1002 of the electronic accessory module 1000 can include high resolution image capture circuits devices so that the electronic accessory module 1000 functions as a high definition camera 1010.

In another embodiment, the module components 1001, 1002 of the electronic accessory module 1000 can include an energy storage device, such as a lithium-based rechargeable battery so that the electronic accessory module 1000 functions as an auxiliary battery 1011 or power source for an attached electronic device (100). In another embodiment, the module components 1001,1002 of the electronic accessory module 1000 can include additional memory circuits and devices so that the electronic accessory module 1000 functions as an auxiliary memory 1012 for the one or more processors (501) of the electronic device.

In another embodiment, the module components 1001, 1002 of the electronic accessory module 1000 can include touch pads, touch sensitive displays, keys, joysticks, or other control devices so that the electronic accessory module 1000 functions as an auxiliary user input 1013 for gaming or other applications. In another embodiment, the module components 1001,1002 of the electronic accessory module 1000 can include feedback devices such as piezoelectric or other tactile feedback devices so that the electronic accessory module 1000 functions as a haptic module 1014 to provide a physical feedback experience to a user. In another embodiment, the module components 1001,1002 of the electronic accessory module 1000 can include light emitting diodes or other emission devices so that the electronic accessory module 1000 functions as an auxiliary light 1015. In another embodiment, the module components 1001,1002 of the electronic accessory module 1000 can include any number of sensors, including fingerprint sensors, moisture sensors, biometric sensors, or environmental sensors so that the electronic accessory module 1000 functions as a sensor device 1016. In still another embodiment, the module components 1001,1002 of the electronic accessory module 1000 can include one or more display devices so that the electronic accessory module 1000 functions as an auxiliary display. This explanatory list of options set forth in FIG. 10 is illustrative only, as the electronic accessory module 1000 can be configured as any number of other devices as will be recognized by those of ordinary skill in the art having the benefit of this disclosure.

In one embodiment, the electronic accessory module 1000 is operable with an electronic device (100). In one embodiment, the module components 1001,1002 are directly responsive to the one or more processors (501) of the electronic device (100). For example, where the module components 1001,1002 are imaging devices, the one or more processors (501) of the electronic device (100) may control the imaging devices to capture pictures and other images. In other embodiments, the electronic accessory module 1000 can include its own processors 1018, memory devices 1019, and communication devices 1020 that are in communication with the one or more processors (501) of the electronic device (100). In either configuration, the module components 1001,1002 provide an enhanced feature set to the electronic device (100) to which the electronic accessory module 1000 is coupled. Note that the module components 1001,1002 can be disposed along the front side of the electronic accessory module 1000, the rear side of the electronic accessory module 1000, or combinations thereof depending upon application.

Turning now back to FIGS. 6-9, many of the mechanical features of one illustrative electronic accessory module 600 are shown. As with the electronic device (100) described above with reference to FIGS. 1-4, while electronic accessory modules configured in accordance with embodiments of the disclosure can be configured with a wide variety of mechanical features and form factors, those shown in FIGS. 6-9 are advantageous in some embodiments in that they allow an electronic device (100) to retain the electronic accessory module 600 securely within a housing as will be described in more detail below.

In one embodiment, the electronic accessory module 600 is configured with a rabbet 801. In one embodiment, the rabbet 801 is complementary in shape to the second rabbet (403) of the electronic device (100) such that a tongue 802 of the rabbet 801 engages the step-shaped recess of the second rabbet (403) of the electronic device (100). As will be described below with reference to FIG. 14, this allows the second rabbet (403) of the electronic device (100) to sit atop the tongue 802 of the rabbet 801 of the electronic accessory module 600 to retain the electronic accessory module 600 within the housing.

In this illustrative embodiment, rabbet 801 is defined by step 803 and side edge 804. Disposed along end edge 805 of the tongue 802 of the rabbet 801 is another electrical connector 806. As will be described in more detail below, the one or more processors (501) of the electronic device 100 are to send one or more of audio data, display data, or haptic data through this electrical connector 806 to the electronic accessory module 600 in one or more embodiments. In other embodiments, the one or more processors (501) of the electronic device 100 are to receive one or more of image data, audio data, sensor data, or power through the electrical connector 806 from the electronic accessory module 600. In this illustrative embodiment, the electrical connector 806 is complementary to the electrical connector (406) of the electronic device (100) in that it is a four terminal connector defined by four conductive contacts being disposed along the end edge 805 of the tongue 802 of the rabbet 801. Additionally, end edge 805 is oriented at an obtuse angle relative to the step 803 so as to be complementary to the side edge 405 of the second rabbet (403) of the electronic device (100). In this illustrative embodiment, the obtuse angle is about 105 degrees.

Figure 11:
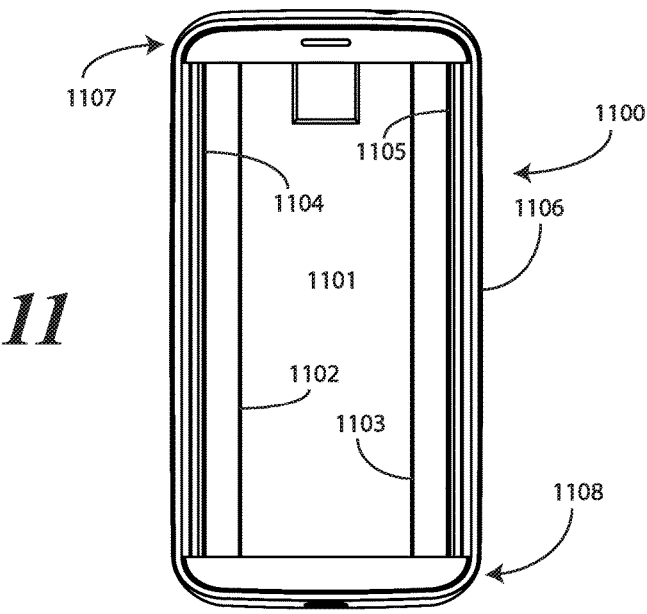
FIG. 11 illustrates a front elevation view of one explanatory housing configured in accordance with one or more embodiments of the disclosure.
Figure 12:
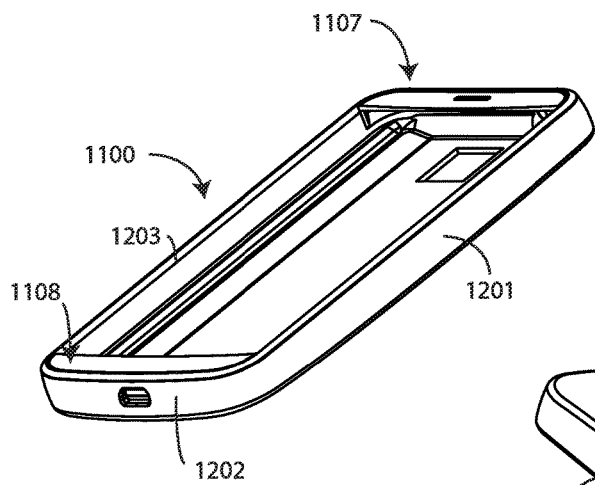
FIG. 12 illustrates a perspective view of one explanatory housing configured in accordance with one or more embodiments of the disclosure.
Figure 13:
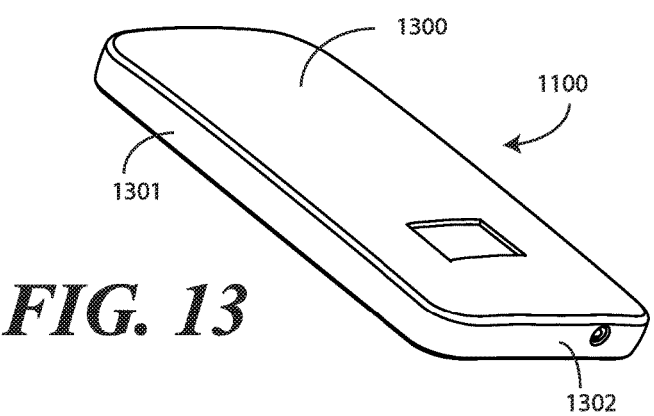
FIG. 13 illustrates another perspective view of one explanatory housing configured in accordance with one or more embodiments of the disclosure.

Turning now to FIGS. 11-13, illustrated therein is one explanatory housing 1100 configured in accordance with one or more embodiments of the disclosure. In one embodiment, the housing 1100 is manufactured from a pliable thermoplastic so that it can be placed about an electronic device (100) and electronic accessory module (600) to bias the first electrical connector (206) of the electronic device (1001 and the second electrical connector (806) of the electronic accessory module (600) together. In one embodiment, the housing 1100 couples to both the electronic device (100) and the electronic accessory module (600) to secure the electronic device (100) and the electronic accessory module (600) module within the housing 1100.

In the illustrative embodiment of FIGS. 11-13, the housing 1100 includes a rear surface 1300 and one or more sidewalls 1201,1202,1301,1302. In one embodiment, the interior 1101 of the rear surface 1300 includes mechanical features 1102,1103,1104 that are complementary in shape to the contours of the component casing (201) disposed on the back side of the electronic device (100) and/or the component casing (702) disposed on the hack side of the electronic accessory module (600).

In one embodiment, the one or more sidewalls 1201,1202, 1301,1302 comprise one or more retention mechanisms 1203,1105 disposed about the periphery of the housing 1100. In one embodiment, the one or more retention mechanisms 1203,1105 mechanisms comprise protrusions extending from the sides of the housing 1100 that are to couple with one or more corresponding coupling mechanisms (301,302, 401,402) of an electronic device (100). In other embodiments, the one or more retention mechanisms 1203,1105 comprise recesses into the sides of the housing 1100. One or more coupling mechanisms (301,302,401,402) disposed along an electronic device (100) can then couple to the one or more retention mechanisms 1203,1105. As noted above, other retention mechanisms, including ramps, snaps, detents, and so forth will be obvious to those of ordinary skill in the art having the benefit of this disclosure.

Figure 14:
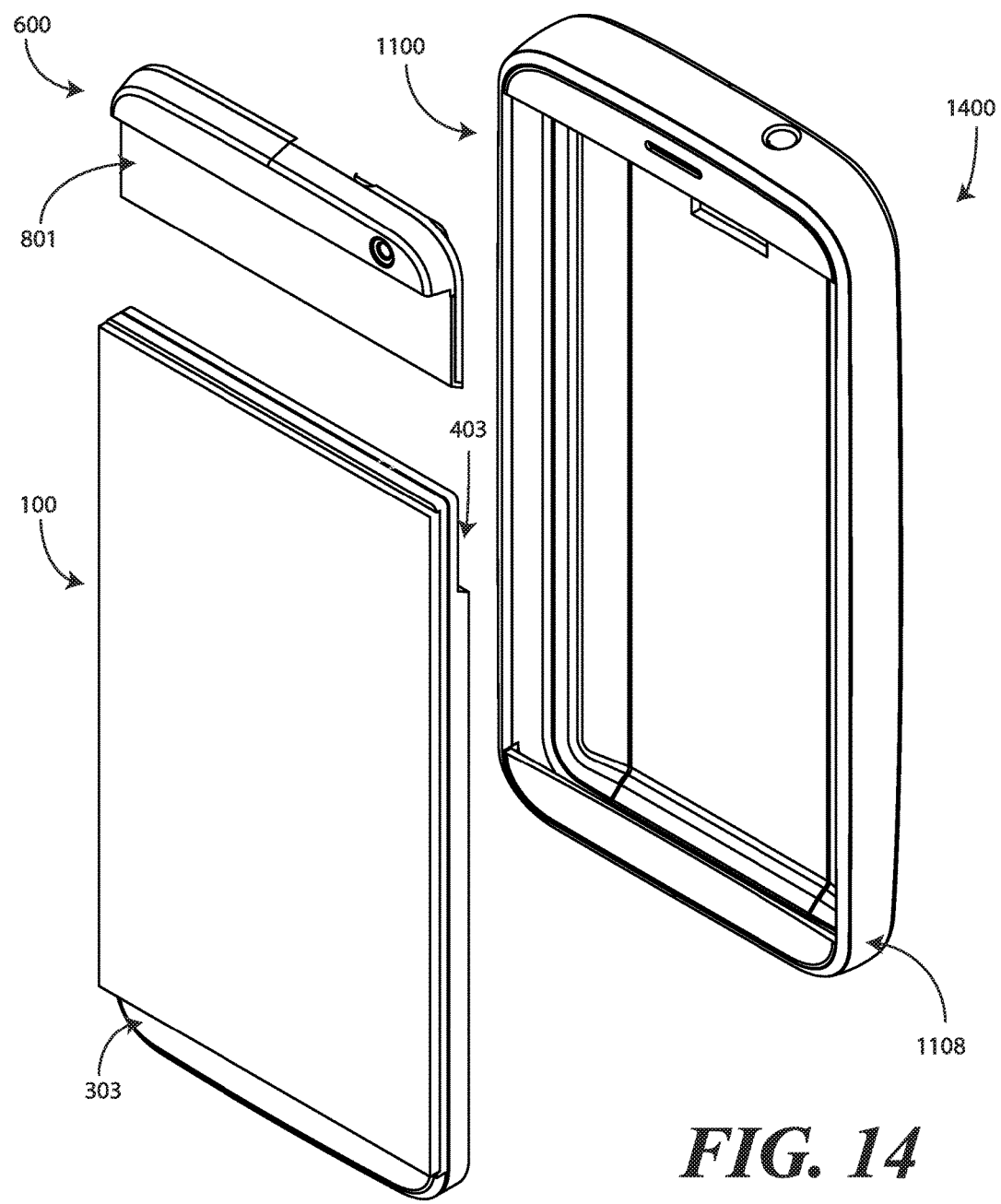
FIG. 14 illustrates an exploded view of one explanatory device in accordance with one or more embodiments of the disclosure.

In one embodiment, the housing 1100 includes a head bay 1107 and a toe bay 1108. Each bay is configured as a recessed area to enclose at least a portion of an electronic device (100) and an electronic accessory module (106). In the illustrative embodiment of FIGS. 11-13, the head bay 1107 is disposed at a first end of the housing 1100 while the toe bay 1108 is disposed at a second end of the housing 1100. The head bay 1107 and the toe bay 1108 assist the housing 1100 in receiving the electronic accessory module (600) at the first in of the housing 1100 and One main advantage offered by embodiments of the disclosure is the ability to build a device as a complete unit that is fully customized in accordance with a user's functionality and stylistic preferences. To wit, a user may obtain an electronic device (100), select a desired electronic accessory module (600), and select a desired housing 1100 that meets the stylistic and functional preferences of the user. Turning now to FIG. 14, illustrated therein is an exploded view of one such device 1400 in accordance with one or more embodiments of the disclosure.

As shown in FIG. 14, a user has selected an electronic device 100, an electronic accessory module 600, and a housing 1100. The electronic accessory module 600 could include any number of components to provide a customized feature set for the device 1400. Illustrating by example, in one embodiment the electronic accessory module 600 comprises an imager operable with the one or more processors (501) of the electronic device 100. In another embodiment, the electronic accessory module 600 comprises an audio transducer operable with the one or more processors (501) of the electronic device 100. In another embodiment, the electronic accessory module 600 comprises a user interface operable with the one or more processors (501) of the electronic device 100. In yet another embodiment, the electronic accessory module 600 comprises an energy storage device to deliver power to the one or more processors (501) of the electronic device 100. Other electronic accessory modules will be obvious to those of ordinary skill in the art having the benefit of this disclosure.

Once these three components are selected, the user may then place the electronic accessory module 600 into the housing, toe in the first rabbet 303 of the electronic device 100 into the toe bay 1108 of the housing, and pivot the electronic device 100 to engage the second rabbet 403 of the electronic device 100 with the rabbet 801 of the electronic accessory module 600. The housing 1100 then biases the first electrical connector (206) of the electronic device 100 and the second electronic connector (806) of the electronic accessory module 600 together. The housing 1100 thus couples to both the electronic accessory module 600 and the electronic device 100 to secure the electronic device 100 and the electronic accessory module 600 within the housing 1100. This modularity not only reduces the cost of the housing 1100 and overall device, but reduces the cost of regulatory testing as well in that a common electronic device 100 can be used in a multitude of customized devices.

Embodiments of the disclosure provide additional advantages over prior art devices as well. For example, in prior art electronic devices, there can be multiple screws and multiple pins that are required to hold a device together. Assembly therefore takes a lot of time and allows many opportunities for error. With embodiments of the disclosure, the internal components are a simple "laminated lump." A housing simply snaps about the lump and its corresponding accessory. This reduces manufacturing error and provides the user with an enhanced experience.

Figure 15:
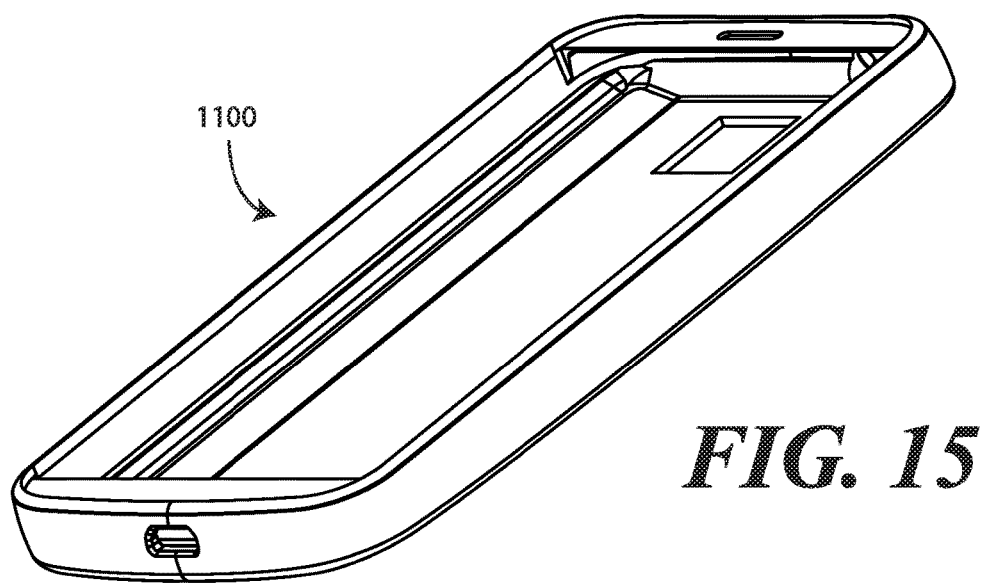
FIG. 15 illustrates one step of an explanatory method in accordance with one or more embodiments of the disclosure.
Figure 16:
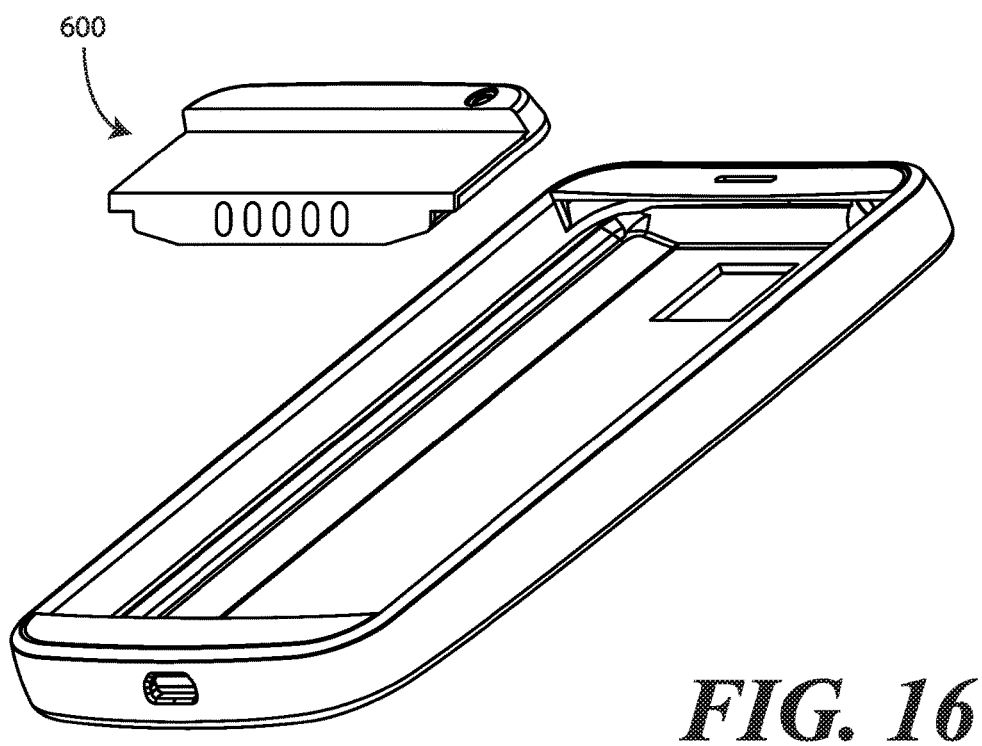
FIG. 16 illustrates one step of an explanatory method in accordance with one or more embodiments of the disclosure.
Figure 17:
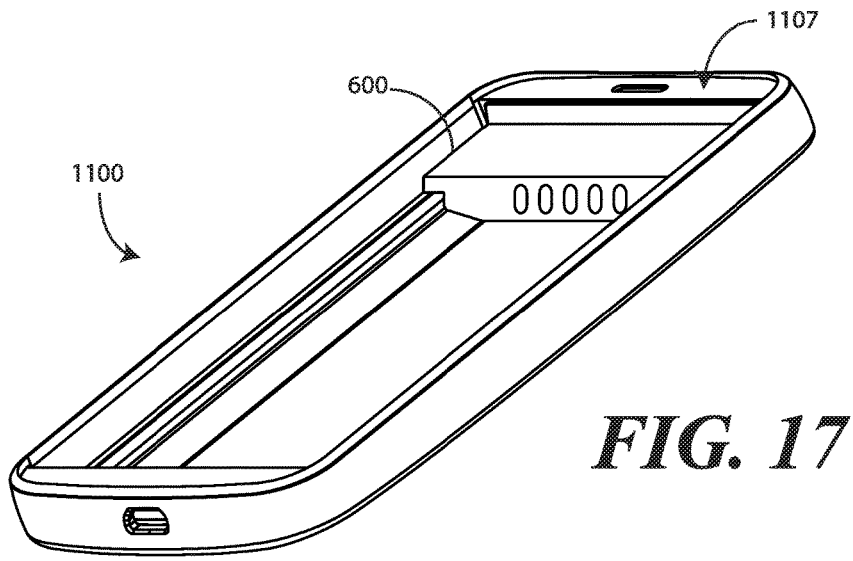
FIG. 17 illustrates one step of an explanatory method in accordance with one or more embodiments of the disclosure.

The assemblage steps are shown illustratively as method steps of FIGS. 15-19. Turning now to FIGS. 15-19, illustrated therein is method of assembling a device (1400) in accordance with one or more embodiments of the disclosure. As shown in FIG. 15, a user first obtains a housing 1100. As shown at FIG. 16, the user then obtains a desired electronic accessory module 600. As shown at FIG. 17, the user then inserts the electronic accessory into a first end of the housing 1100. The user here has inserted the electronic accessory module 600 into the housing 1100 such that the electronic accessory module 600 engages the head bay 1107 when the electronic accessory module 600 is disposed within the housing 1100. Specifically, a portion of the electronic accessory module 600 is seated within the head bay 1107 as shown in FIG. 17.

Figure 18:
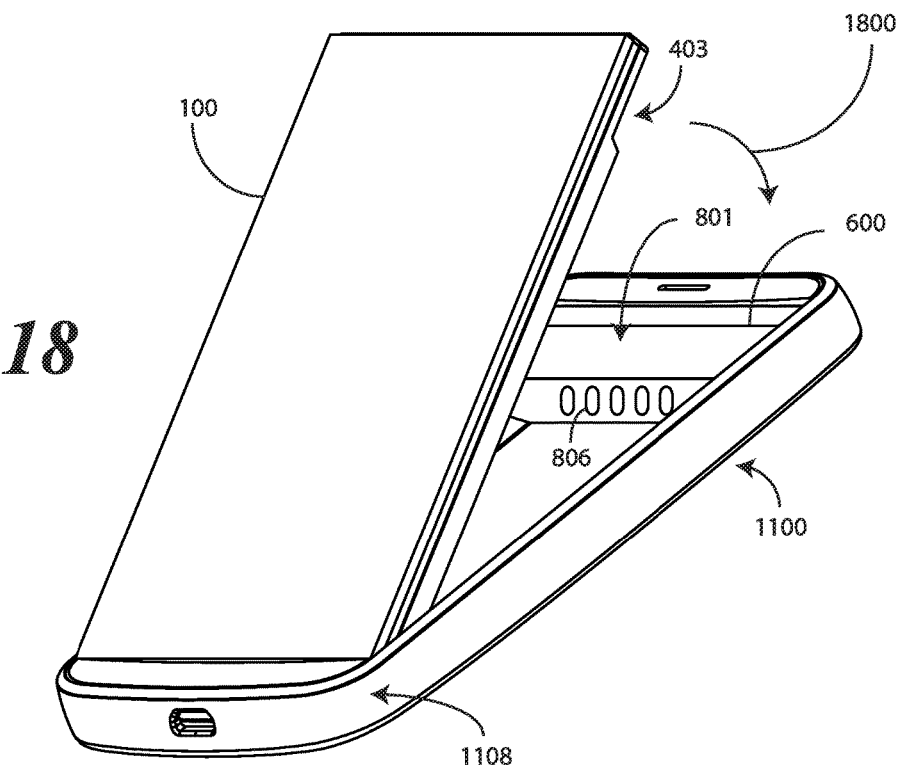
FIG. 18 illustrates one step of an explanatory method in accordance with one or more embodiments of the disclosure.

As shown in FIG. 18, the user then obtains an electronic device 100. The step shown in FIG. 18 is that of toeing an end of an electronic device 100 into a second end of the housing 1100. This causes the first rabbet (303) of the electronic device 100 to engage the toe bay 1108 when the electronic device 100 is disposed within the housing 1100. The user then pivots the electronic device 100 to engage the first electrical connector (206) with the second electrical connector 806 so that the one or more processors (501) of the electronic device can send one or more of audio data, display data, or haptic data through the first electrical connector (206) and the second electrical connector 806 to the electronic accessory module 600 and/or receive one or more of image data, audio data, sensor data, or power through the first electrical connector (206) and the second electrical connector 806 from the electronic accessory module 600. This pivoting 1800 also causes rabbet 403 to engage complementary rabbet 801 when the electronic device 100 and the electronic accessory module 600 are disposed within the housing 1100. The resulting electronic device 1400 is shown in FIG. 19, where the user has locked the electronic device 100 into the housing 1100 to retain both the electronic device 100 and the electronic accessory module 600 into the housing 1100.

Figure 19:
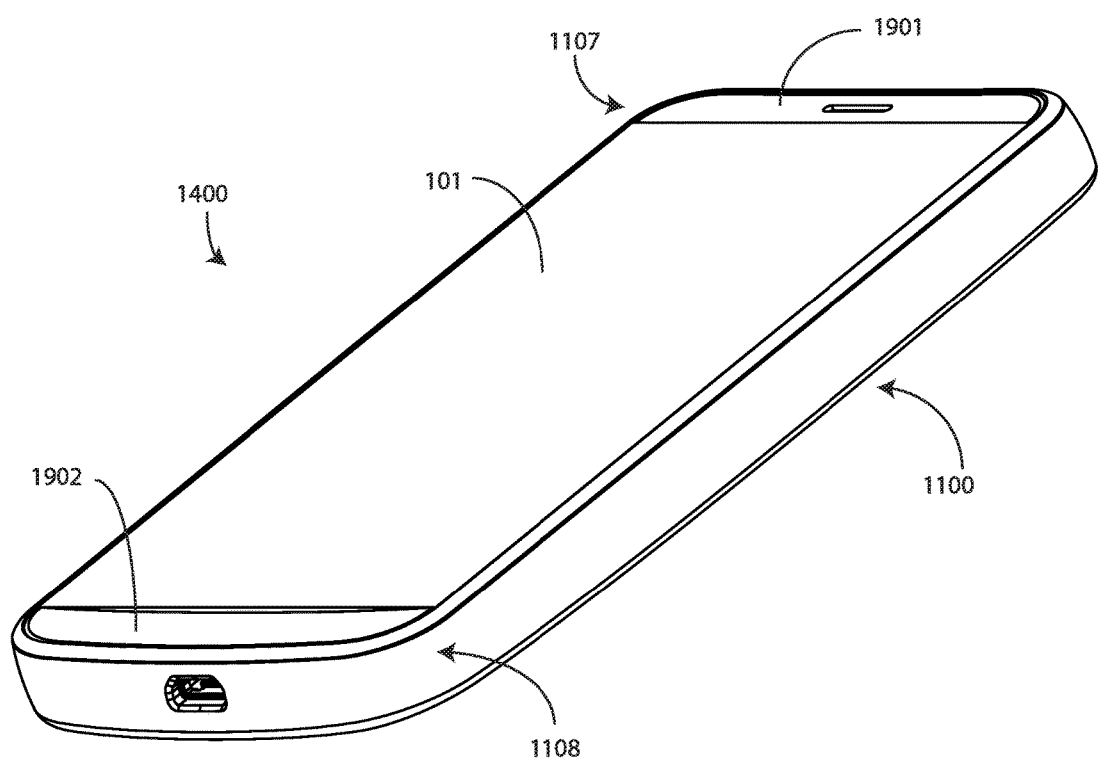
FIG. 19 illustrates one explanatory device in accordance with one or more embodiments of the disclosure.

FIG. 19 also includes an optional step. In one or more embodiments, one or more caps 1901,1902 have been attached to the head bay 1107 and toe bay 1108 of the housing 1100. Provision of these optional caps 1901,1902 allows for additional customization as the caps 1901,1902 can be manufactured in various colors, include branding information, or include logos, symbols, or other indicia desired by a user. Thus, in one embodiment, the method of FIGS. 15-19 includes optionally attaching one or more caps 1901,1902 to exteriors of one or more bays of the housing 1100.

Figure 20:
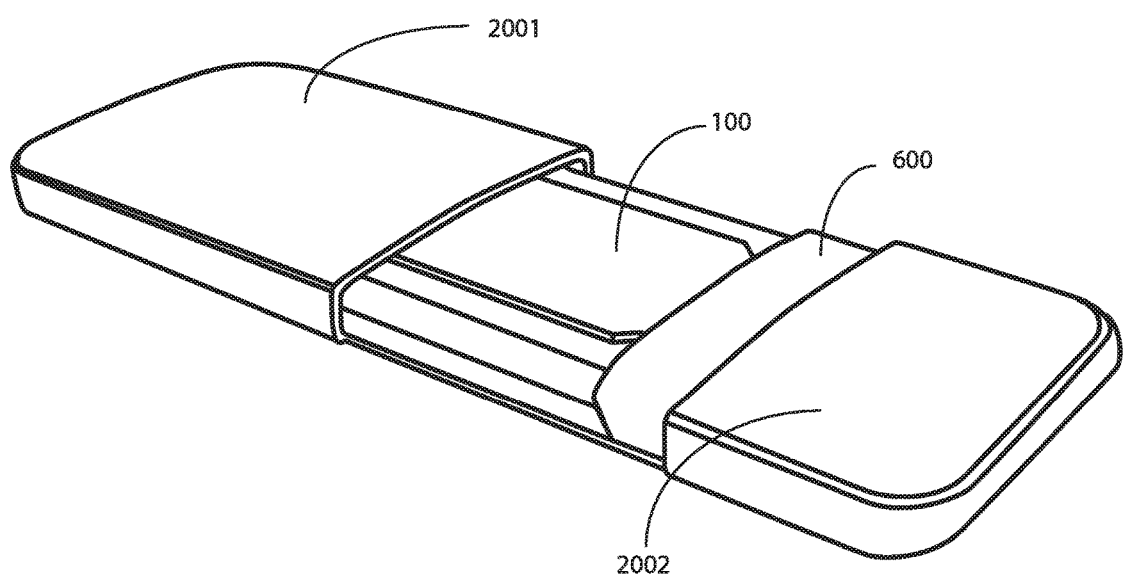
FIG. 20 illustrates an alternate device in accordance with one or more embodiments of the disclosure.
Figure 21:
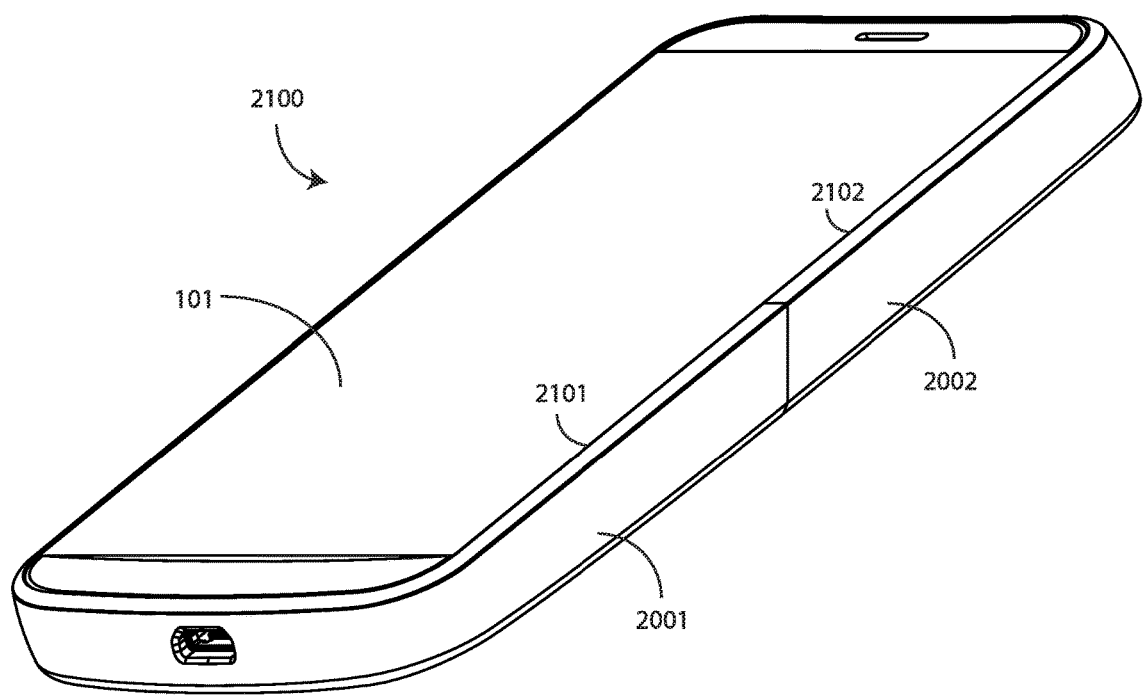
FIG. 21 illustrates an explanatory partial assembly in accordance with one or more embodiments of the disclosure.

Turning now to FIG. 20, illustrated therein is an alternate housing 2000 suitable for use with one or more embodiments of the disclosure. In FIG. 20, the housing 2000 includes a first housing 2001 and a second housing 2002. The first housing is to receive a portion of the electronic device 100 while the second housing 2002 is to receive the electronic accessory module 600 and another portion of the electronic device. The first housing 2001 and the second housing 2002 then couple together to bias the first electrical connector (206) against the second electrical connector (806) and to secure the electronic device 100 and the electronic accessory module 600 within the first housing 2001 and the second housing 2002. The resulting device 2100 is shown in FIG. 21. As also shown in FIG. 21 the first housing 2001 defines a first peninsular aperture 2101, while the second housing defines a second peninsular aperture 2102. The display 101 is visible through the first peninsular aperture 2101 and the second peninsular aperture 2102 when the first housing 2001 is coupled to the second housing 2002.

FIGS. 22-26 illustrate various ways that devices configured in accordance with embodiments of the disclosure can be customized. These examples are illustrative only, as others will be readily apparent to those of ordinary skill in the art having the benefit of this disclosure.

Figure 22:
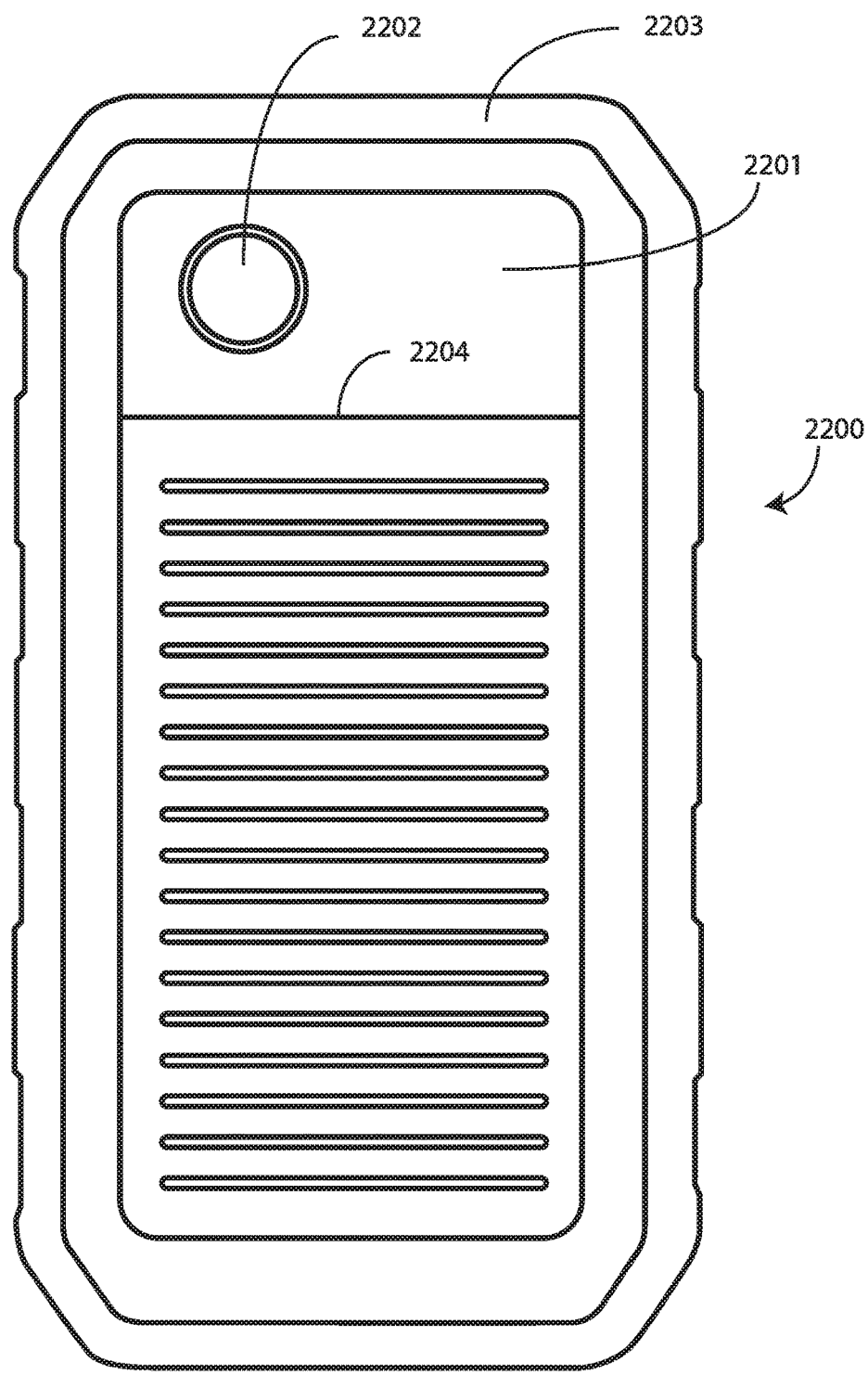
FIG. 22 illustrates a rear elevation view of one explanatory device in accordance with embodiments of the disclosure.

Beginning with FIG. 22, the device 2200 has been configured by coupling an electronic accessory 2201 having an imaging device 2202 with an electronic device (100). The housing 2203 has been configured as a workman's case that is highly protective and is suitable for protecting the device 2200 from drops, bumps, and hits in harsh environments such as worksites. The rear side of the housing 2203 has an aperture 2204 so that the imaging device 2202 can capture images from the rear side of the device 2200. The housing 2203 of FIG. 22 is a "break buster" in that it protects the electronic device (100) and the electronic accessory 2201 from breaking in harsh environs.

Figure 23:
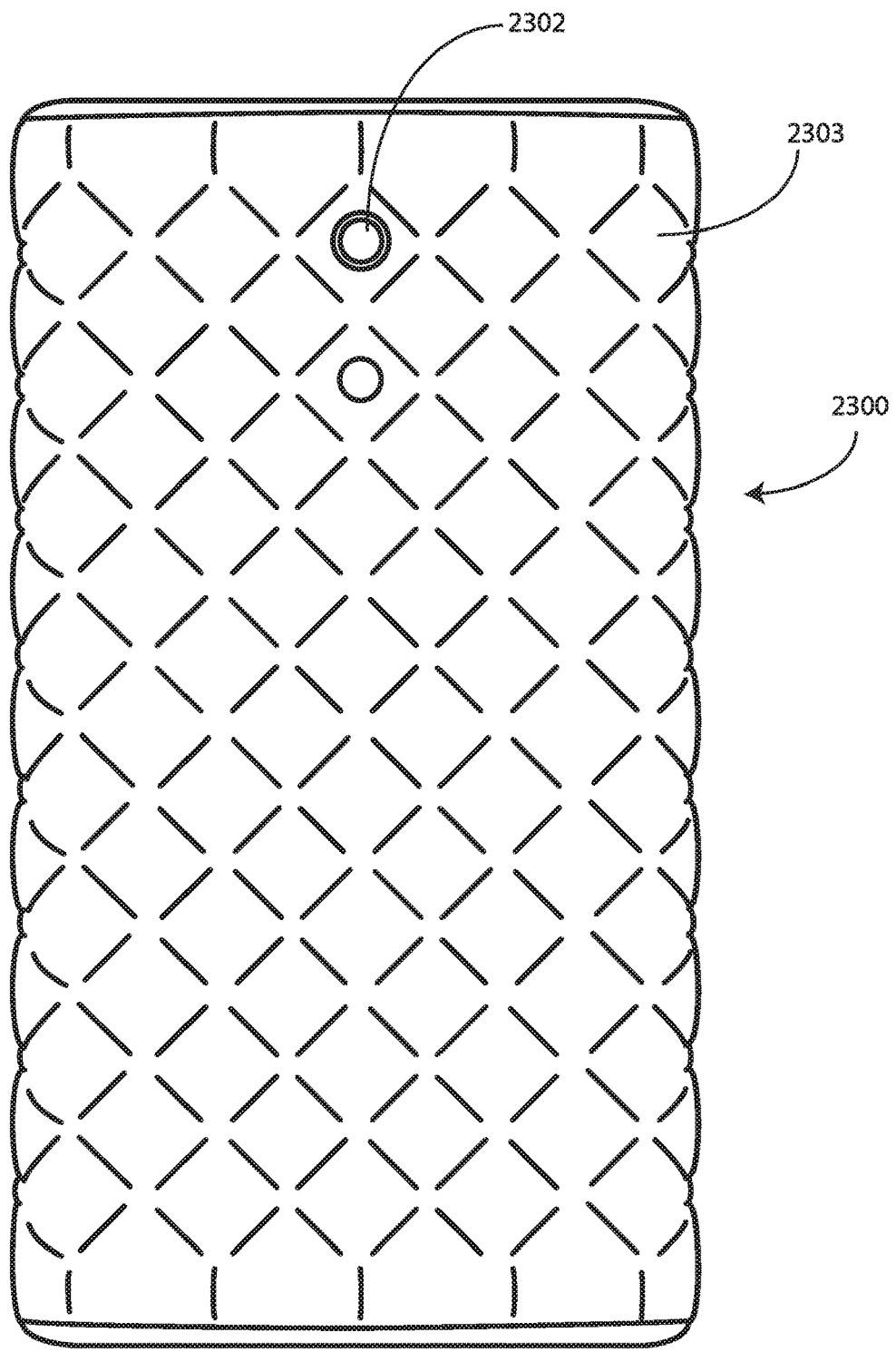
FIG. 23 illustrates another rear elevation view of one explanatory device in accordance with embodiments of the disclosure.

Turning now to FIG. 23, the device 2300 has also been configured by coupling an electronic accessory having an imaging device 2302 with an electronic device (100). The housing 2303 has been wrapped with pink faux leather so as to serve as a woman's fashion accessory. One beauty part of embodiments of the disclosure is that a user can change from pink faux leather to blue suede simply by changing the housing 2303.

Figure 24:
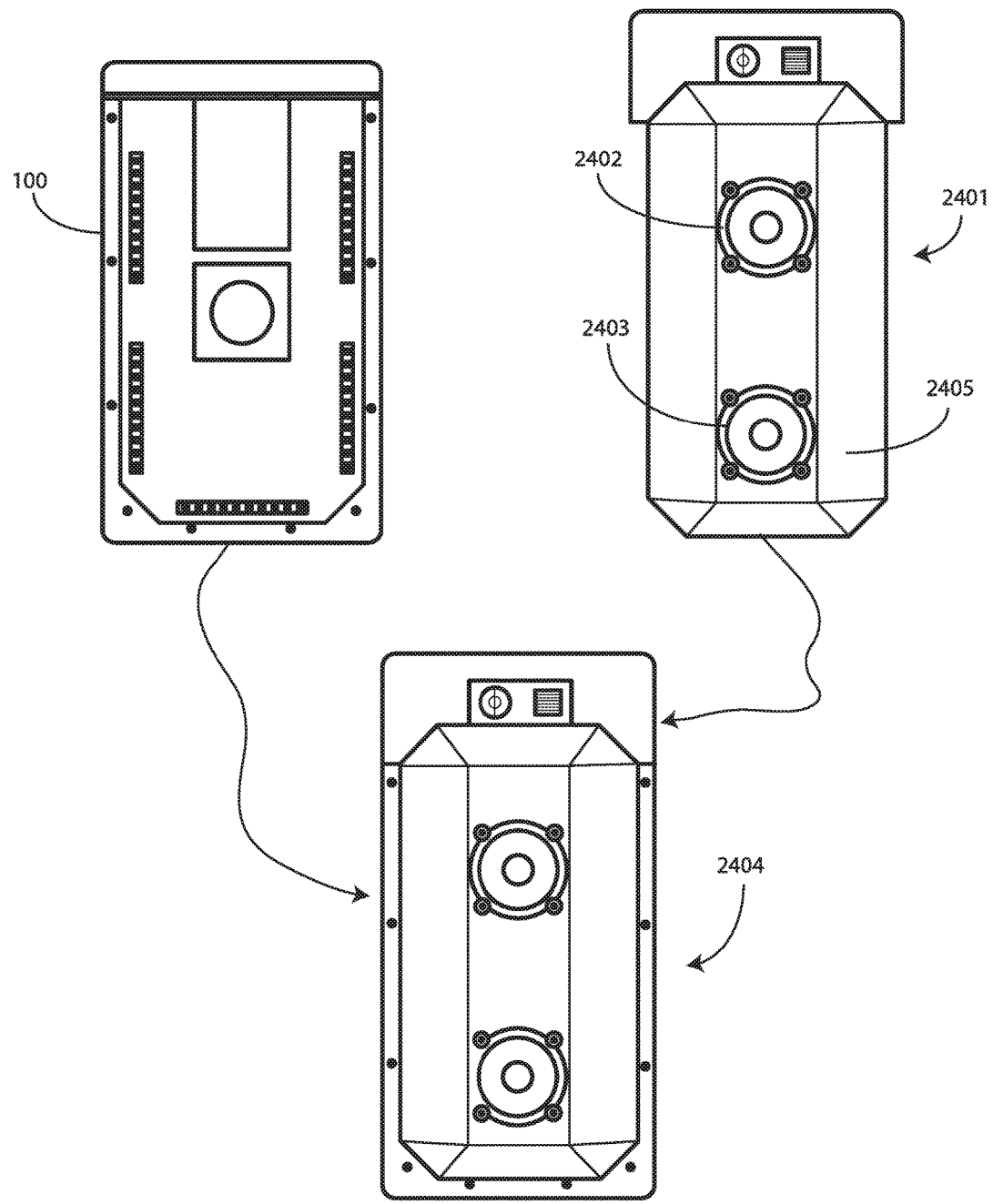
FIG. 24 illustrates another explanatory partial assembly in accordance with one or more embodiments of the disclosure.
Figure 25:
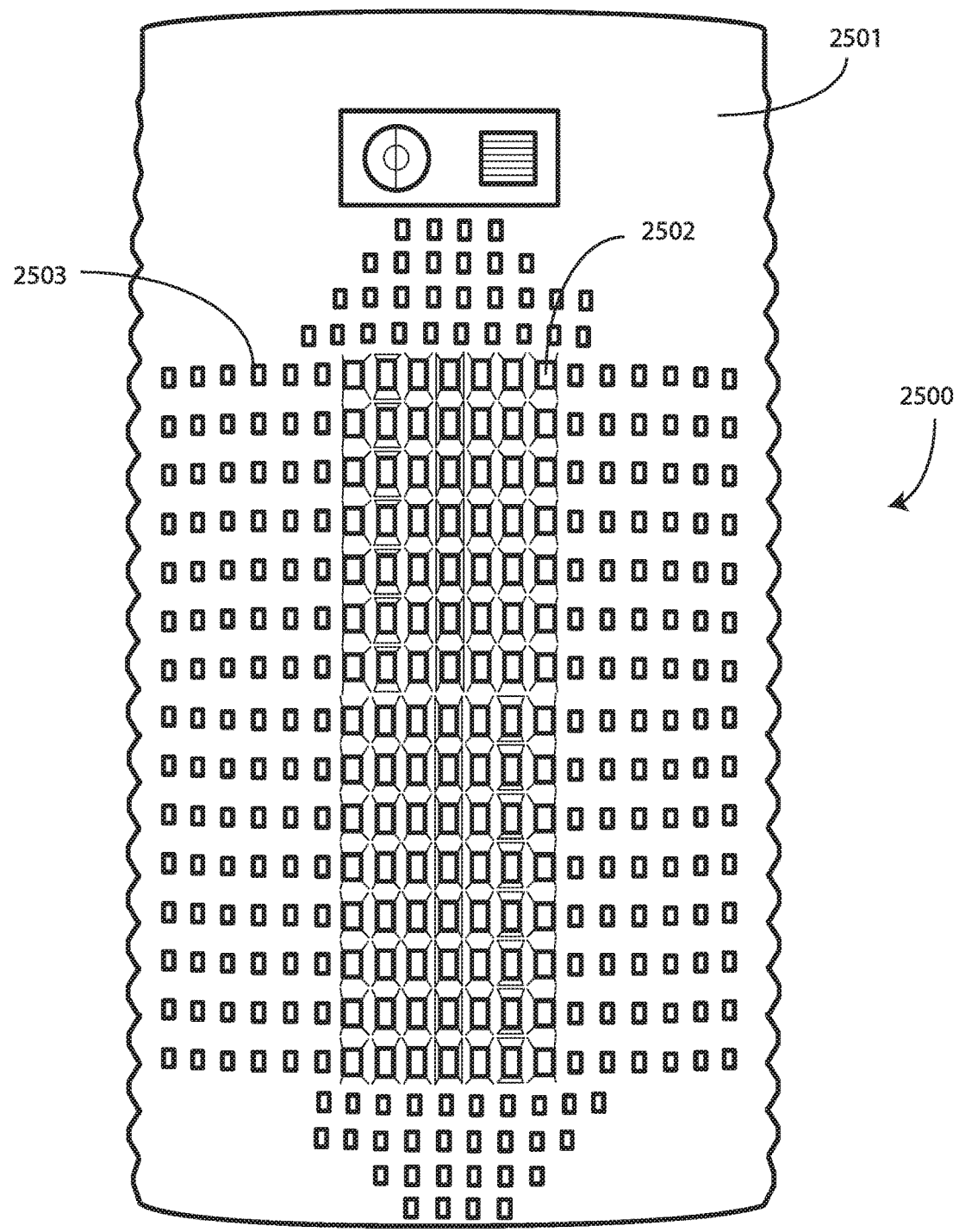
FIG. 25 illustrates another rear elevation view of one explanatory device in accordance with one or more embodiments of the disclosure.

In FIG. 24, the electronic accessory 2401 includes a killer acoustic amp 2405 and loudspeakers 2402,2403. When attached to an electronic device 100, the resulting assembly 2400 bangs out enough decibels to satisfy even the most hardcore rocker. As shown in FIG. 25, to ensure that the housing 2501 does not interfere with this acoustic perfection, the housing 2501 includes apertures 2502 and protrusions 2503 to allow the rock and roller to both hear the music from the loudspeakers (2402,2403) and to hold on to the device 2500 while moshing across a pit at their favorite show.

Figure 26:
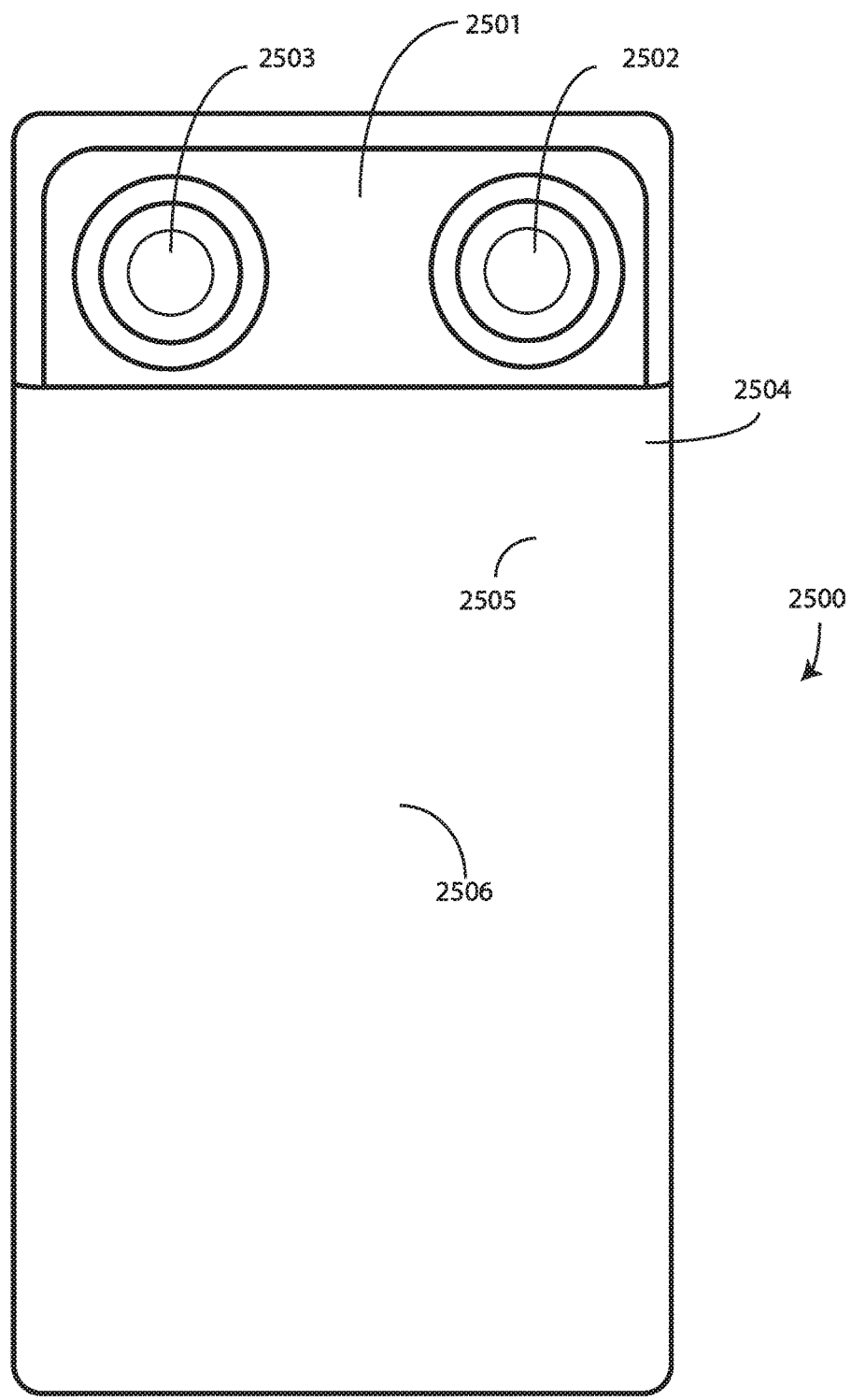
FIG. 26 illustrates another rear elevation view of one explanatory device in accordance with one or more embodiments of the disclosure.

In FIG. 26, the device 2600 includes an electronic accessory 2601 that has two imagers 2602,2603 so as to function as a stereo camera device. Such a device 2600 may be used, for example, by an extreme curler to record videos of epic descents head first on a curling sled. To provide the curler with suggestions of tearing through fresh powder while sitting at the office, the housing 2604 of this embodiment includes decorative elements 2605,2606 configured as snow peaks. The decorative elements 2605,2606 give the exterior of the housing 2604 the appearance of a mountain range that serves as a mnemonic reminder of the videos of death defying curling runs stored within the device 2600.

As will be appreciated from reviewing FIGS. 22-26, embodiments of the disclosure provide advantages over prior art designs not only in device functionality, but in device appearance and aesthetic as well. In prior art designs, users frequently purchase after market covers for their electronic devices. Instead, embodiments of the disclosure provide the electronic device and accessory module, and the let a purchaser—on a customized basis even—pick the housing that they desire. The housing can even be printed or decorated as desire. There are a variety of options for building the electronic device. Embodiments of the disclosure can completely eliminate the cost and the screws associated with prior art designs. This is in addition to offering the user customization options that were not available previously. Embodiments of the disclosure allow for a "made to order" model for purchasing electronic devices. A purchaser simply goes to a kiosk, store, or on-line portal and picks the colors and patterns they want for the housing, selects an appropriate accessory module, and builds a customized device. Retailers or marketers can sell customized devices as well. What's more, the user is free to change housings and accessory modules at any time to re-customize their device.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. A device, comprising:
   a housing comprising a first end forming a recessed bay, and a second end;
   an electronic device comprising at least one processor, at least one memory device, a display, and a first electrical connector,
   wherein a first rabbet is defined into a rear side of the electronic device, and
   wherein a second rabbet is defined into a front side of the electronic device and extends beyond a bottom of the display; and
   an electronic accessory module, operable with the at least one processor of the electronic device, and comprising a second electrical connector,
   wherein a third rabbet complementary in shape to the first rabbet of the electronic device is defined into the electronic accessory module, and
   wherein when the electronic device and the electronic accessory module are disposed and secured within the housing, (i) the second rabbet of the electronic device engages the recessed bay of the first end of the housing, (ii) the electronic accessory module engages the second end of the housing, (iii) the first electrical connector is biased together with the second electrical connector, and (iv) the third rabbet of the electronic accessory module engages with the first rabbet of the electronic device.

2. The device of claim 1, wherein the electronic device further comprises a component casing, and wherein the second rabbet is defined into the component casing.

3. The device of claim 1, wherein the third rabbet of the electronic accessory module comprises a tongue that engages a step-shaped recess of the first rabbet of the electronic device.

4. The device of claim 3, wherein when the third rabbet of the electronic accessory module engages with the first rabbet of the electronic device, the first rabbet sits atop the tongue of the third rabbet.

5. The device of claim 3, wherein the second electrical connector of the electronic accessory module is disposed along the tongue of the third rabbet.

6. The device of claim 1, wherein the housing further comprises a set of retention mechanisms that couples with a corresponding set of coupling mechanisms of the electronic device.

7. The device of claim 1, wherein the first electrical connector is disposed on the first rabbet of the electronic device, and the second electrical connector is disposed on the third rabbet of the electronic accessory module.

8. The device of claim 1, wherein the electronic device is a portable phone that supports wireless communication and display of visual output by the display.

9. The device of claim 1, wherein the electronic device further comprises a component casing into which the second rabbet is defined.

10. The device of claim 1, wherein the first electrical connector is disposed on the first rabbet of the electronic device, and the second electrical connector is disposed on the additional rabbet of the electronic accessory.

11. A device, comprising:
an electronic device having a front side and a rear side, and comprising:
a processor,
a memory,
a display disposed along at least a portion of the front side of the electronic device,
a first electrical connector,
a first rabbet defined into the rear side of the electronic device, and
a second rabbet defined into the front side of the electronic device and extending beyond a bottom of the display;
an electronic accessory comprising:
a second electrical connector configured for data communication with the processor of the electronic device, and
an additional rabbet complementary in shape to the first rabbet of the electronic device; and
a housing comprising a first end forming a recessed bay and a second end;
wherein when the electronic device and the electronic accessory are disposed and secured within the housing, the second rabbet of the electronic device engages the recessed bay of the first end of the housing, (ii) the electronic accessory engages the second end of the housing, (iii) the first electrical connector is biased together with the second electrical connector, and (iv) the additional rabbet of the electronic accessory engages with the first rabbet of the electronic device.

12. The device of claim 11, wherein the additional rabbet of the electronic accessory comprises a tongue that engages a step-shaped recess of the first rabbet of the electronic device.

13. The device of claim 12, wherein when the additional rabbet of the electronic accessory engages with the first rabbet of the electronic device, the first rabbet sits atop the tongue of the additional rabbet.

14. The device of claim 12, wherein the second electrical connector of the electronic accessory is disposed along the tongue of the additional rabbet.

15. The device of claim 11, wherein the housing further comprises a set of retention mechanisms that couples with a corresponding set of coupling mechanisms of the electronic device.

16. The device of claim 11, wherein the electronic device is a portable phone that supports wireless communication and display of visual output by the display.

17. A method of assembling a device, the method comprising:
inserting, into a first end of a housing, an electronic accessory comprising a first electrical connector and a first rabbet;
toeing a second rabbet of an electronic device into a recessed bay of a second end of the housing, the electronic device comprising a second electrical connector and a third rabbet complementary in shape to the first rabbet of the electronic accessory and defined into a rear side of the electronic device, the second rabbet defined into a front side of the electronic device and extending beyond a bottom of a display of the electronic device;
pivoting the electronic device to (i) engage the first electrical connector of the electronic accessory with the second electrical connector of the electronic device, and (ii) engage the first rabbet of the electronic accessory with the third rabbet of the electronic device; and
securing the electronic device and the electronic accessory within the housing.

* * * * *